US006835451B2

(12) United States Patent
Ejiri

(10) Patent No.: US 6,835,451 B2
(45) Date of Patent: Dec. 28, 2004

(54) MAGNETIC RECORDING MEDIUM

(75) Inventor: Kiyomi Ejiri, Odawara (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/660,587

(22) Filed: Sep. 12, 2003

(65) Prior Publication Data

US 2004/0115480 A1 Jun. 17, 2004

(30) Foreign Application Priority Data

Sep. 13, 2002 (JP) .......................................... 2002-267480

(51) Int. Cl.⁷ .............................................. G11B 5/714
(52) U.S. Cl. ................................. 428/336; 428/694 BA
(58) Field of Search ........................... 428/336, 694 BA

(56) References Cited

U.S. PATENT DOCUMENTS 6,641,891 B2 * 11/2003 Doushita et al. ........... 428/65.3

* cited by examiner

*Primary Examiner*—Stevan A. Resan
(74) *Attorney, Agent, or Firm*—Sughrue Mion, PLLC

(57) ABSTRACT

Provided is a magnetic recording medium which has excellent electromagnetic characteristics in an MR head and which is suited to high-density digital recording, especially suited to reproduction in an MR head. The magnetic recording medium comprises a magnetic layer comprising a ferromagnetic powder and a binder on a nonmagnetic support. The magnetic layer has a residual magnetization Φr ranging from 5 to 50 mA, and ratio (Sdc/Sac) of average area Sdc of magnetic clusters under DC magnetized condition to average area Sac of magnetic clusters under AC erased condition ranges from 0.8 to 2.0.

14 Claims, No Drawings

MAGNETIC RECORDING MEDIUM

FIELD OF THE INVENTION

The present invention relates to a magnetic recording medium capable of high-density recording.

BACKGROUND OF THE INVENTION

Conventionally, magnetic recording media such as video tapes, audio tapes, and magnetic disks having a magnetic layer of ferromagnetic iron oxide, cobalt-modified ferromagnetic iron oxide, $CrO_2$, ferromagnetic alloy powders, or the like dispersed in binder that is coated on a nonmagnetic support have been widely employed. In recent years, the trend has been toward high densification accompanied by narrowing of the track width and shortening of the recording wavelength. Thus, the use of high-sensitivity magnetoresistive heads (referred to hereinafter as "MR heads") in reproduction has been proposed and put into practice.

When employing MR heads, characteristics differing from those of conventional inductive head media are required. That is, since a thick magnetic layer and excessive residual magnetization result in saturation of an MR head, it is necessary to reduce residual magnetization. Further, since MR heads are highly sensitive, it is necessary to employ a microgranular magnetic powder and smoothen the magnetic surface to reduce medium noise. To that end, the magnetic layer thickness is made from 0.01 to 0.3 μm and residual magnetization is kept to 5 to 50 mA to prevent saturation, while specifying roughness at specified spacial frequency in an attempt to reduce modulation noise (see Japanese Unexamined Patent Publication (KOKAI) No. 2001-256633). Further, the magnetic layer is made thinner than the shortest bit length and nonmagnetic powder is added to the magnetic layer to achieve a volume packing density of 15 to 35 percent in the magnetic layer in an attempt to achieve both saturation and low noise (see Japanese Unexamined Patent Publication (KOKAI) No. 2002-92846). The technique described in Japanese Unexamined Patent Publication (KOKAI) No. 2001-256633 permits a reduction in the noise caused by surface roughness. The technique described in Japanese Unexamined Patent Publication (KOKAI) No. 2002-92846 reduces the volume packing density of the magnetic material, thereby reducing magnetostatic interaction, but nonmagnetic powder and magnetic powder aggregate, resulting in nonuniform distribution. That is, the cited prior art is problematic in that uniform distribution of magnetic particles in the magnetic layer, required to reduce noise, is not achieved.

Considerable analytic research is being conducted into medium noise caused by the continuous aggregation of magnetic particles and loop-shaped aggregation. However, this is a presumption based on mathematic calculation, and specific medium parameters and medium control methods have yet to be proposed (see Jiro Norihashi, "Noise Theory of Microgranular Recording Media and Methods of Isolating and Estimating Noise Sources", Bulletin of the Japan Applied Magnetism Society, 1997, Vol. 21, No. 4-1, pp. 149–159, and P. Luo, H. N. Bertram, "Tape Medium Noise Measurements and Analysis", IEEE Transactions on Magnetics, USA, 2001, Vol.37, No.4, pp.1620–1623). A large number of inventions have been made relating to improvement in dispersibility, but they have not achieved improvement in the microstructure of the magnetic layer.

It is an object of the present invention to provide a magnetic recording medium which has excellent electromagnetic characteristics in an MR head and which is suited to high-density digital recording, especially suited to reproduction in an MR head.

The present inventors conducted extensive research into medium noise, resulting in the discovery of the structural parameters of the magnetic layer that are required to reduce noise from the perspective of micromagnetics. They also discovered that by controlling these structural parameters, it was possible to achieve reduction in noise to an unprecedented level; the present invention was devised on that basis.

That is, the aforementioned object of the present invention is achieved by:

a magnetic recording medium comprising a magnetic layer comprising a ferromagnetic powder and a binder on a nonmagnetic support, wherein the magnetic layer has a residual magnetization Φr ranging from 5 to 50 mA, and the ratio (Sdc/Sac) of the average area Sdc of magnetic clusters under DC magnetized condition to the average area Sac of magnetic clusters under AC erased condition ranges from 0.8 to 2.0.

In the aforementioned magnetic recording medium, it is preferable that the ferromagnetic powder has an average particle size (which denotes a maximum length in a powder having an anisotropic shape) ranging from 5 to 120 nm, as well as, the volume packing density of the ferromagnetic powder in the magnetic layer is equal to or higher than 35 percent.

The mechanism of the present invention is described below.

[Saturation Magnetization Φr]

MR heads can achieve higher reproduction output than inductive heads. With prior art inductive heads, increased residual magnetization of the magnetic layer has been examined. However, with MR heads, when the residual magnetization becomes excessively high, noise increases because the nonlinear portion of the operating curve is employed. Thus, in MR heads, it is known that high residual magnetization is not necessarily associated with improved performance. Accordingly, in the present invention, the residual magnetization Φr of the magnetic layer is made 5 to 50 mA based on the element thickness and saturation magnetization of the MR head employed, thereby preventing saturation of the head. The residual magnetization Φr of the magnetic layer preferably ranges from 7 to 40 mA, more preferably from 10 to 35 mA. When residual magnetization exceeds 50 mA, head saturation occurs, and when residual magnetization is less than 5 mA, magnetization is inadequate and adequate reproduction output is precluded.

There are various methods of controlling residual magnetization. For example, when reproducing with an MR head, it is suitable to set the level of residual magnetization to a low value within the above-stated range while increasing the number of particles. In that case, for example, it is suitable that magnetic powder with a σs of 50 to 130 A·m²/kg is employed and the amount of binder in magnetic and nonmagnetic layers is reduced to yield a fill density as high as possible. Specifically, iron alloy power with a σs of 80 to 130 A·m²/kg and hexagonal ferrite, magnetite, cobaltferrite, and the like with a σs of 40 to 80 A·m²/kg may be employed.

[The Magnetic Cluster Area Ratio]

It is also widely theoretically known that a high packing density of magnetic microparticles reduces noise. However, particularly when magnetic microparticles are employed, there are problems in that the magnetic particles aggregate, generating a portion behaving just like a large magnetic material and diminishing the S/N ratio. The present inventors discovered that magnetic blocks (referred to hereinafter as "magnetic clusters") measured by magnetic force microscopy (MFM) were related to medium noise, changing with aggregation and magnetostatic bonding of magnetic particles. Accordingly, they conducted extensive research into the relation between the S/N ratio and the ratio (Sdc/Sac) of the average area Sdc of magnetic clusters under DC magnetized condition to the average area Sac of magnetic clusters under AC erased condition, resulting in the discovery that a good SIN ratio was achieved when the Sdc/Sac ratio fell within a range of 0.8 to 2.0. Accordingly, in the present invention, the range of Sdc/Sac ratio is set to 0.8 to 2.0, preferably 0.8 to 1.7, and more preferably from 0.8 to 1.5. The Sdc/Sac ratio is essentially never less than 0.8, and when it exceeds 2.0, noise increases and a good S/N ratio cannot be achieved.

In the magnetic recording medium of the present invention, the Sdc and the Sac are each preferably from 3,000 to 50,000 nm$^2$, more preferably from 4,000 to 40,000 nm$^2$, and further preferably from 5,000 to 35,000 nm$^2$. The minimum value of the magnetic cluster area is determined by the size of the primary magnetic particles. At equal to or greater than 3,000 nm$^2$, magnetization is not rendered unstable by thermal fluctuation, and at equal to or less than 50,000 nm$^2$, there are few magnetization inversion units and high resolution can be achieved during high-density recording.

The size of the magnetic clusters basically depends on the dispersion of the magnetic particles and their dispersion stability. In prior art magnetic recording media, it is impossible to completely prevent reaggregation during the coating, orientation, and drying steps, and thus impossible to achieve Sdc/Sac ratio of 0.8 to 2.0. Accordingly, achieving Sdc/Sac ratio within the above-stated range requires high-level dispersion and stabilization of the magnetic particles, and either maintaining a stable state of dispersion during the coating step, or breaking up the reaggregation occurring during the coating step. In the present invention, binder affording good dispersibility is adsorbed onto microgranular magnetic material and dispersed in a dispersion medium having a high specific gravity. Strong shear is then imparted during coating to break up clusters that have reaggregated, thereby achieving the above-stated Sdc/Sac ratio. A binder having a high affinity for solvents is preferably employed as a binder. For example, a binder containing polyurethane having an inertial radius of 5 to 25 nm in cyclohexanone is preferably employed. A detailed description is given in Japanese Unexamined Patent Publication (KOKAI) Heisei No. 9-27115. Since dispersion and stabilization are possible with a small quantity of the above-described binder, it is also possible to increase the volume packing density at the same time. In achieving the above-stated Sdc/Sac ratio, reaggregated clusters produced during orientation are also effectively broken down by imparting a high shear following coating and orientation. For example, a smoother can be employed to impart shear following orientation. Here, the term "smoother" refers to a device bringing a rigid body (in the form of a plate or rod) having a smooth surface into contact with a wet magnetic layer surface to impart an intense shear force. The rigid body employed is preferably mirror-polished to a surface roughness Ra of equal to or less than 2 nm. The shear force is a function of the viscosity of the coating liquid, the coating rate, and the coating thickness, and can be optimized based on the objective.

Further, when the present invention is being applied to a magnetic recording medium of multilayer structure, a (dry-on-wet) method in which the magnetic layer is applied after the nonmagnetic layer has dried is preferably employed. In multilayer coating conducted while both the magnetic layer and nonmagnetic layer are still wet (wet-on-wet coating), shear is preferably imparted to a coating liquid within a coating head by the method disclosed in Japanese Unexamined Patent Publication (KOKAI) Showa No. 62-95174 or Heisei No. 1-236968 to prevent deterioration of electromagnetic characteristics of the magnetic recording medium due to aggregation of magnetic particles.

In the magnetic recording medium of the present invention, the thickness of the magnetic layer preferably ranges from 10 to 150 nm, more preferably from 20 to 120 nm, and further preferably from 30 to 100 nm. When the magnetic layer is thin and Φr becomes excessively low, good reproduction output cannot be ensured even when employing an MR head. Conversely, when the magnetic layer is excessively thick, head saturation tends to occur and the overwrite erasure rate deteriorates. Accordingly, in the magnetic recording medium of the present invention, in which the magnetic layer Φr ranges from 5 to 50 mA, the magnetic layer thickness preferably falls within the above-stated range.

In the magnetic recording medium of the present invention, the coercive force (Hc) preferably ranges from 142 to 316 kA/m, more preferably from 158 to 276.5 kA/m, further preferably from 174 to 253 kA/m. The surface roughness (Ra) preferably ranges from 1 to 4 nm, more preferably from 1.5 to 3.5 nm, further preferably from 1.5 to 3 nm. It is further preferable to control the pattern of the surface roughness as in Japanese Unexamined Patent Publication (KOKAI) No. 2001-256633.

There is no limitation regarding materials of the ferromagnetic powder used in the present invention. For example, acicular α-Fe, Fe—Co, Fe—Pt alloy powder, plate-shaped hexagonal ferrite powder, hexagonal Co powder and the like can be used. The coercive force (Hc) of the magnetic particle preferably ranges from 140 to 320 kA/m, more preferably from 160 to 280 kA/m, further preferably from 170 to 255 kA/m. As mentioned above, it is necessary to set σs to the extent that Φr within a range of 5 to 50 mA is achieved because σs affects the saturation magnetization Φr of the magnetic layer.

Particles having an anisotropic shape preferably have a maximum diameter of 5 to 120 nm, more preferably from 8 to 100 nm, and further preferably from 10 to 85 nm. The volume packing density of magnetic particles in the magnetic layer is preferably equal to or higher than 35 percent and more preferably equal to or higher than 40 percent. A higher packing density is desirable, but the upper limit is essentially fixed at about 60 percent in order to form a coated film.

The magnetic recording medium of the present invention preferably has a lower nonmagnetic layer. The presence of this lower nonmagnetic layer increases the effectiveness of forming during calendering, facilitating the achievement of a smooth surface. When a lower layer is provided, lubricant can be incorporated into the lower layer to be supplied to the magnetic layer. The lower layer can also be rendered electrically conductive. The nonmagnetic powder used in the present invention can be selected from inorganic compounds such as metal oxides, metal carbonates, metal sulfates, metal nitrides, metal carbides, metal sulfides and the like. Examples of the inorganic compounds are α-alumina having an α-conversion rate equal to or higher than 90 percent, β-alumina, γ-alumina, silicon carbide, chromium oxide, cerium oxide, α-iron oxide, corundum, silicon nitride, titanium carbide, titanium dioxide, silicon dioxide, tin oxide, magnesium oxide, tungsten oxide, zirconium oxide, boron nitride, zinc oxide, calcium carbonate, calcium sulfate, barium sulfate, and molybdenum disulfide; these may be employed singly or in combination. Particular desirable are titanium dioxide, zinc oxide, iron oxide and barium sulfate. Even more preferred is titanium dioxide and α-iron oxide. The particle size of these nonmagnetic powders preferably ranges from 0.005 to 2 μm, but nonmagnetic powders of differing particle size may be combined as needed, or the particle diameter distribution of a single nonmagnetic powder may be broadened to achieve the same effect. The range from 0.01 to 0.2 μm is particularly preferred.

The tap density of the nonmagnetic powder contained in the nonmagnetic layer preferably ranges from 0.05 to 2 g/ml, more preferably from 0.2 to 1.5 g/ml. The moisture content preferably ranges from 0.1 to 5 weight percent, more preferably from 0.2 to 3 weight percent. The pH preferably ranges from 2 to 11, further preferably from 6 to 9. The specific surface area preferably ranges from 1 to 100 m$^2$/g, more preferably from 5 to 50 m$^2$/g, further preferably from 7 to 40 m$^2$/g. The crystallite size preferably ranges from 0.01 to 2 μm. The oil absorption capacity using dibutyl phthalate (DBP) preferably ranges from 5 to 100 ml/100 g, more preferably from 10 to 80 m/100 g, further preferably from 20 to 60 ml/100 g. The specific gravity preferably ranges from 1 to 12, more preferably from 3 to 6. The shape may be any of acicular, spherical, polyhedral or plate-shaped. The ignition loss is preferably equal to or less than 20 weight percent. The Mohs' hardness of the aforementioned inorganic powder used in the present invention is preferably equal to or higher than 4. The roughness factor of the powder surface preferably ranges from 0.8 to 1.5, more preferably from 0.9 to 1.2. The stearic acid (SA) adsorption capacity preferably ranges from 1 to 20 μmol/m$^2$, more preferably from 2 to 15 μmol/m$^2$. The heat of wetting in 25° C. water of the nonmagnetic powder is preferably within a range of $2.0 \times 10^{-5}$ to $6.0 \times 10^{-5}$ J/cm$^2$ (200 to 600 erg/cm$^2$). A solvent with a heat of wetting within this range may also be employed. The quantity of water molecules on the surface at 100 to 400° C. suitably ranges from 1 to 10 pieces per 100 Angstroms. The pH of the isoelectric point in water preferably ranges from 3 to 6.

The surface of these powders is preferably treated with $Al_2O_3$, $SiO_2$, $TiO_2$, $ZrO_2$, $SnO_2$, $Sb_2O_3$ and ZnO. The surface-treating agents of preference with regard to dispersibility are $Al_2O_3$, $SiO_2$, $TiO_2$ and $ZrO_2$, and $Al_2O_3$, $SiO_2$ and ZrO2 are further preferable. They may be employed singly or in combination. Depending on the objective, a surface-treatment coating layer with a coprecipitated material may also be employed, the coating structure which comprises a first alumina coating and a second silica coating thereover or the reverse structure thereof may also be adopted. Depending on the objective, the surface-treatment coating layer may be a porous layer, with homogeneity and density being generally desirable.

Conventionally known thermoplastic resins, thermosetting resins, reactive resins and mixtures thereof may be employed as binders employed in the present invention. Thermoplastic resins suitable for use are those having a glass transition temperature of –100 to 150° C., having a number average molecular weight of 1,000 to 200,000, preferably 10,000 to 100,000, and having a degree of polymerization of about 50 to 1,000. Examples thereof are polymers and copolymers comprising structural units in the form of vinyl chloride, vinyl acetate, vinyl alcohol, maleic acid, acrylic acid, acrylic acid esters, vinylidene chloride, acrylonitrile, methacrylic acid, methacrylic acid esters, styrene, butadiene, ethylene, vinyl butyral, vinyl acetal, and vinyl ether; polyurethane resins; and various rubber resins. Further, examples of thermosetting resins and reactive resins are phenol resins, epoxy resins, polyurethane cured resins, urea resins, melamine resins, alkyd resins, acrylic reactive resins, formaldehyde resins, silicone resins, epoxy polyamide resins, mixtures of polyester resins and isocyanate prepolymers, mixtures of polyester polyols and polyisocyanates, and mixtures of polyurethane and polyisocyanates. These resins are described in detail in the *Handbook of Plastics* published by Asakura Shoten.

It is possible to employ known electron-beam curing resins in the nonmagnetic and magnetic layers. Examples thereof as well as manufacturing methods are described in detail in Japanese Unexamined Patent Publication (KOKAI) Showa No. 62-256219. These resins may be employed singly or in combination. Desirable examples are combinations of a polyurethane resin and one or more resins selected from the group consisting of vinyl chloride resins, vinyl chloride vinyl acetate resins, vinyl chloride vinyl acetate vinyl alcohol resins, and vinyl chloride vinyl acetate maleic anhydride copolymers; and combinations thereof with polyisocyanate. Known polyurethane structures may be employed, such as polyester polyurethane, polyether polyurethane, polyether polyester polyurethane, polycarbonate polyurethane, polyester polycarbonate polyurethane, and polycaprolactone polyurethane. To achieve better dispersibility and durability, one or more polar groups selected from the group consisting of COOM, $SO_3M$, $OSO_3M$, $P=O(OM)_2$, $O-P=O(OM)_2$, (where M denotes a hydrogen atom or an alkali metal base), OH, $NR_2$, $N^+R_3$ (where R denotes a hydrocarbon group), epoxy groups, SH, and CN is preferably incorporated as needed into any of the above-listed binders by copolymerization or addition reaction for use. The quantity of the polar group is preferably from $10^{-1}$ to $10^{-8}$ mol/g, more preferably from $10^{-2}$ to $10^{-6}$ mol/g. The binder of particular preference in the present invention is polyurethane having a cyclic molecular structure, good solubility in cyclohexanone and the like, and an inertial radius in solvent of 10 to 25 nm. A specific description is given in Japanese Unexamined Patent Publication (KOKAI) Heisei No. 9-27115.

Examples of polyisocyanates suitable for use in the present invention are tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, triphenylmethane triisocyanate, and other isocyanates; products of these isocyanates and polyalcohols; polyisocyanates produced by condensation of isocyanates; and the like. These isocyanates are commercially available under the following trade names, for example: Coronate L, Coronate HL, Coronate 2030, Coronate 2031, Millionate MR and Millionate MTL manufactured by Nippon Polyurethane Industry Co. Ltd.; Takenate D-102, Takenate D-110N, Takenate D-200 and Takenate D-202 manufactured by Takeda Chemical Industries Co. Ltd.; and Desmodule L, Desmodule IL, Desmodule N and Desmodule HL manufactured by Sumitomo Bayer Co. Ltd. They can be used singly or in combinations of two or more in the nonmagnetic layer and the magnetic layer by exploiting differences in curing reactivity.

Known materials, primarily with a Mohs' hardness equal to or higher than 6, such as α-alumina having an α-conversion rate equal to or higher than 90 percent, β-alumina, silicon carbide, chromium oxide, cerium oxide, α-iron oxide, corundum, artificial diamond, silicon nitride, titanium carbide, titanium oxide, silicon dioxide, and boron nitride, may be used singly or in combination as abrasives employed in the present invention. Further, a composite comprising two or more of these abrasives (an abrasive obtained by surface-treating one abrasive with another) may also be used. Although these abrasives may contain compounds and elements other than the main component or element in some cases, there is no change in effect so long as the main component constitutes equal to or higher than 90 percent. The particle size of these abrasives preferably ranges from 0.01 to 2 $\mu$m. As needed, abrasives of differing particle size may be combined or the same effect may be achieved by broadening the particle diameter distribution even with a single abrasive. A tap density of 0.3 to 2 g/ml, a moisture content of 0.1 to 5 weight percent, a pH of 2 to 11, and a specific surface area of 1 to 30 m$^2$/g are desirable. The abrasive employed in the present invention may be any of acicular, spherical or cubic in shape, but shapes that are partially angular have good abrasion properties and are thus preferred. Specific examples of abrasives suitable for use in the present invention are: AKP-20, AKP-30, AKP-50, HIT-50 and HIT-100 from Sumitomo Chemical Co., Ltd.; G-5, G-7 and S-1 from Nippon Chemical Industrial Co., Ltd.; TF100 and TF-140 from Toda Kogyo Corp. Different types, quantities, and combinations of abrasives may be employed in the present invention in the magnetic layer and nonmagnetic layer based on the objective. The abrasive may be first dispersed in binder and then added to the coating material. The number of abrasives present on the surface and on the side surfaces of the magnetic layer of the magnetic recording medium of the present invention is preferably equal to or greater than 5 particles/100 $\mu$m$^2$.

In the present invention, substances having lubricating effects, antistatic effects, dispersive effects, plasticizing effects, or the like may be employed as additives. Examples are: molybdenum disulfide; tungsten graphite disulfide; boron nitride; graphite fluoride; silicone oils; silicones having a polar group; fatty acid-modified silicones; fluorine-containing silicones; fluorine-containing alcohols; fluorine-containing esters; polyolefins; polyglycols; alkylphosphoric esters and their alkali metal salts; alkylsulfuric esters and their alkali metal salts; polyphenyl ethers; fluorine-containing alkylsulfuric esters and their alkali metal salts; monobasic fatty acids having 10 to 24 carbon atoms (which may contain an unsaturated bond or may be branched) and metal (e.g., Li, Na, K, Cu) salts thereof; monohydric, dihydric, trihydric, tetrahydric, pentahydric and hexahydric alcohols having 12 to 22 carbon atoms (which may contain an unsaturated bond or be branched); alkoxy alcohols having 12 to 22 carbon atoms; monofatty esters, difatty esters, or trifatty esters comprising a monobasic fatty acid having 10 to 24 carbon atoms (which may contain an unsaturated bond or be branched) and any one from among a monohydric, dihydric, trihydric, tetrahydric, pentahydric or hexahydric alcohol having 2 to 12 carbon atoms (which may contain an unsaturated bond or be branched); fatty esters of monoalkyl ethers of alkylene oxide polymers; fatty acid amides having 8 to 22 carbon atoms; aliphatic amines having 8 to 22 carbon atoms; and the like.

Specific examples of the above compounds are: lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol and lauryl alcohol. It is also possible to employ nonionic surfactants such as alkylene oxide-based surfactants, glycerin-based surfactants, glycidol-based surfactants and alkylphenolethylene oxide adducts; cationic surfactants such as cyclic amines, ester amides, quaternary ammonium salts, hydantoin derivatives, heterocycles, phosphoniums, and sulfoniums; anionic surfactants comprising acid groups, such as carboxylic acid, sulfonic acid, phosphoric acid, sulfuric ester groups, and phosphoric ester groups; and ampholytic surfactants such as amino acids, amino sulfonic acids, sulfuric or phosphoric esters of amino alcohols, and alkyl betaines. Details of these surfactants are described in *Surfactants Handbook* (published by Sangyo Tosho Co., Ltd.).

These lubricants, antistatic agents and the like need not be 100 percent pure and may contain impurities, such as isomers, unreacted materials, by-products, decomposition products, and oxides in addition to the main components. These impurities are preferably comprised equal to or less than 30 percent, and more preferably equal to or less than 10 percent.

The lubricants and surfactants employed in the present invention may be employed differently in the magnetic layer and nonmagnetic layer as needed based on type and quantity. For example, it is conceivable to control bleeding onto the surface through the use in the magnetic layer and the nonmagnetic layer of fatty acids having different melting points, to control bleeding onto the surface through the use of esters having different boiling points and polarities, to improve coating stability by adjusting the amount of surfactant, and to enhance the lubricating effect by increasing the amount of lubricant added to the nonmagnetic layer; this is not limited to the examples given here. All or some of the additives used in the present invention may be added at any stage in the process of manufacturing the magnetic coating liquid. For example, they may be mixed with the ferromagnetic powder before a kneading step; added during a step of kneading the ferromagnetic powder, the binder, and the solvent; added during a dispersing step; added after dispersing; or added immediately before coating. Depending on the objective, part or all of the additives may be applied by simultaneous or sequential coating after the magnetic layer has been applied to achieve a specific purpose. Depending on the objective, the lubricant may be coated on the surface of the magnetic layer after calendering or making slits.

The organic solvent employed in the present invention may be used in any ratio. Examples are ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethylformamide; and hexane. These organic solvents need not be 100 percent pure and may contain impurities such as isomers, unreacted materials, by-products, decomposition products, oxides and moisture in addition to the main components. The content of these impurities is preferably equal to or less than 30 percent, more preferably equal to or less than 10 percent. Preferably the same type of organic solvent is employed in the present invention in the magnetic layer and in the nonmagnetic layer. However, the amount added may be varied. The stability of coating is increased by using a solvent with a high surface tension (such as cyclohexanone or dioxane) in the nonmagnetic layer. Specifically, it is important that the arithmetic mean value of the upper layer solvent composition be not less than the arithmetic mean value of the lower layer solvent composition. To improve dispersibilities, a solvent having a somewhat strong polarity is desirable. It is desirable that solvents having a dielectric constant equal to or higher than 15 are comprised equal to or higher than 50 percent of the solvent composition. Further, the dissolution parameter is desirably from 8 to 11.

In the thickness structure of the magnetic recording medium of the present invention, the nonmagnetic flexible support preferably has a thickness of 1 to 100 μm, more preferably 4 to 80 μm. The combined thickness of the magnetic layer and the nonmagnetic layer preferably falls within a range of $1/100^{th}$ to twice the thickness of the nonmagnetic flexible support. An undercoating layer may be provided between the nonmagnetic flexible support and the nonmagnetic layer to enhance adhesion. The thickness of the undercoating layer is preferably from 0.01 to 2 μm, more preferably from 0.02 to 0.5 μm. A backcoat layer may be provided on the opposite side of the nonmagnetic support from the magnetic layer. The thickness of the backcoat layer is preferably from 0.1 to 2 μm, more preferably from 0.3 to 1.0 μm. Known undercoating layers and backcoat layers may be employed.

The nonmagnetic flexible support employed in the present invention may be a known film in the form of a polyester such as polyethylene terephthalate or polyethylene naphthalate, a polyolefin, cellulose triacetate, polycarbonate, polyamide, polyimide, polyamidoimide, polysulfone, aramid, or aromatic polyamide. The support may be in advance subjected to corona discharge treatment, plasma treatment, adhesion-enhancing treatment, heat treatment, dust-removal treatment, or the like. To achieve the objective of the present invention, a nonmagnetic flexible support with a centerline average surface roughness (cutoff value 0.25 mm) of equal to or less than 0.03 μm, preferably equal to or less than 0.02 μm, and more preferably, equal to or less than 0.01 μm, is preferably employed. The nonmagnetic support preferably not only has a low centerline average surface roughness, but also preferably has no rough protrusions of equal to or greater than 1 μm. The roughness of the surface can be controlled as desired by adding filler in required amounts and sizes to the support. Examples of such fillers are oxides and carbonates of Ca, Si, Ti, and the like; and acrylic-based organic micropowders and the like. The F-5 value in the tape running direction of the nonmagnetic support employed in the present invention is preferably from 49 to 490 MPa (5 to 50 kg/mm$^2$). The F-5 value in the tape width direction is preferably from 29.4 to 294 MPa (3 to 30 kg/mm$^2$). Although the F-5 value of the tape in the longitudinal direction is usually higher than the F-5 value of the tape in the width direction, this is not a requirement so long as there is no particular need to increase the strength in the width direction.

The process for manufacturing the magnetic coating material of the magnetic recording medium of the present invention comprises at least a kneading step, a dispersing step, and a mixing step to be carried out, if necessary, before and/or after the kneading and dispersing steps. Each of the individual steps may be divided into two or more stages. All of the starting materials employed in the present invention, including the ferromagnetic powder, binders, carbon black, abrasives, antistatic agents, lubricants, solvents, and the like, may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion.

To achieve the object of the present invention, conventionally known manufacturing techniques may be utilized for some of the steps. It is effective for improving the fill density of the magnetic particles that a kneader having a strong kneading force, such as a continuous kneader or a pressure kneader, is preferably employed in the kneading step. When a continuous kneader or pressure kneader is employed, the ferromagnetic powder and all or part of the binder (preferably equal to or higher than 30 percent of the entire quantity of binder) can be kneaded in a range of 15 to 500 weight parts per 100 weight parts of the ferromagnetic powder. Details of the kneading process are described in Japanese Unexamined Patent Publication (KOKAI) Heisei No. 1-106338 and Japanese Unexamined Patent Publication (KOKAI) Showa No. 64-79274. Further, it is desirable to use a dispersing medium with a high specific gravity for the preparation of the lower nonmagnetic layer coating liquid, and zirconia beads are suitable for use. The magnetic layer may be coated by a known method. In multilayer coating, such methods include multilayer coating methods in which both the magnetic layer and nonmagnetic layer are applied while wet (wet-on-wet coating) and multilayer coating methods in which the nonmagnetic layer is dried before applying the magnetic layer (wet-on-dry coating). In wet-on-wet coating, shear is preferably applied to the coating liquid in the coating head by the method disclosed in either Japanese Unexamined Patent Publication (KOKAI) Showa No. 62-95174 or Heisei No. 1-236968 to prevent deterioration in electromagnetic characteristics of the magnetic recording medium due to aggregation of magnetic particles. To achieve the Sdc/Sac ratio specified by the present invention, following coating the magnetic layer, it is desirable to conduct smoothing during the orientation step to further intensify the shear. In the orientation treatment, for example, a solenoid of equal to or greater than 0.1 T (1,000 G) and a cobalt magnet of equal to or greater than 0.2 T (2,000 G) are preferably employed in combination with like poles opposed, and a suitable drying step is preferably conducted prior to orientation so as to achieve the greatest degree of orientation following drying. Further, when applying the present invention to a disk medium, it is necessary to employ a randomizing orientation method. Still further, to vary the orientation directions of the upper magnetic layer and the lower magnetic layer, it is not necessary that the orientation direction is the longitudinal direction and the in-plane direction; they may be oriented in the vertical direction and width direction as well.

Heat resistant plastic rolls, such as epoxy, polyimide, polyamide and polyimidoamide, may be employed as the calendering rolls. Metal rolls may be employed. The processing temperature is prefeably equal to or higher than 70° C., more preferably equal to or higher than 80° C. The linear pressure is preferably equal to or higher than 200 kg/cm, more preferably equal to or higher than 300 kg/cm.

Embodiments

Embodiments are given below by way of specifically describing the present invention in greater detail. The "parts" referred to in Embodiments are "weight parts".

Nonmagnetic Layer

| | |
|---|---|
| Nonmagnetic powder α-Fe$_2$O$_3$<br>Average major axis length: 0.1 μm<br>Specific surface area by BET method: 48 m$^2$/g<br>pH: 8<br>Fe$_2$O$_3$ content: equal to or higher than 90 percent<br>DBP oil absorption capacity: 27 to 38 ml/100 g<br>Surface treatment agent: Al$_2$O$_3$ | 80 parts |
| Carbon black<br>Average primary particle diameter: 16 nm<br>DBP oil absorption capacity: 80 ml/100 g<br>pH: 8.0<br>Specific surface area by BET method: 250 m$^2$/g<br>Volatile content: 1.5 percent | 20 parts |
| Vinyl chloride copolymer<br>MR-110 manufactured by Nippon Zeon Co., Ltd. | 9 parts |
| Polyester polyurethane resin<br>Neopentylglycol/caprolactone polyol/MDI<br>(4,4'-diphenylmethane diisocyanate) =<br>0.9/2.6/1 —SO$_3$Na group content: 1 × 10$^{-4}$ eq/g<br>Tg: 65° C. | 8 parts |
| Butyl stearate | 1 part |
| Stearic acid | 1 part |
| Methyl ethyl ketone | 100 parts |
| Cyclohexanone | 50 parts |
| Toluene | 50 parts |

Magnetic Layer

| | |
|---|---|
| Ferromagnetic metal powder (composition:<br>Fe/Co = 80/20)<br>Hc: 182 kA/m<br>Specific surface are by BET method: 65 m$^2$/g<br>Crystallite size: 105 Å<br>Surface treatment agent: Al$_2$O$_3$<br>Particle size (major axis diameter): 0.45 μm<br>Acicular ratio: 6<br>σ s: 110 A · m$^2$/kg (110 emu/g) | 100 parts |
| Polyurethane resin A | 12 parts |
| α–alumina (particle size: 0.3 μm) | 2 parts |
| Carbon black (particle size: 0.10 μm) | 0.5 part |
| Butyl stearate | 1 part |
| Stearic acid | 3 parts |
| Methyl ethyl ketone | 90 parts |
| Cyclohexanone | 30 parts |
| Toluene | 60 parts |

| Composition for the synthesis of polyurethane resin A (molar ratio) | |
|---|---|
| Hydrogenated bisphenol A | 0.6 |
| Polypropylene oxide adduct of bisphenol A | 0.3 |
| Sulfoisophthalic acid ethylene oxide adduct | 0.05 |
| Diphenylmethane diisocyanate | 1.0 |
| Trimethylolpropane —SO$_3$Na | 0.05 |
| group content: 6 × 10$^{-5}$ eq/g<br>Tg: 65° C. | |

| Composition for the synthesis of polyurethane resin B (molar ratio) | |
|---|---|
| Neopentylglycol | 0.9 |
| Caprolactone polyol | 2.6 |
| MDI (4,4'-diphenylmethane diisocyanate) —SO$_3$Na | 1.0 |
| group content: 1 × 10$^{-4}$ eq/g<br>Tg: 65° C. | |

After kneading each component of the nonmagnetic layer coating liquid mentioned above in a continuous kneader, they were dispersed in a sand mill with zirconia beads. One part of polyisocyanate was added to the dispersion obtained. For the magnetic layer coating liquid, all the components except for the 3 parts of alumina, carbon black, and vinyl chloride; 5 parts of methyl ethyl ketone; and 5 parts of cyclohexanone were kneaded in a continuous kneader and then dispersed in a sand mill with zirconia beads. The above-listed remaining components were then dispersed for 6 hours in a ball mill with steel balls, filtered, and then admixed to the previously dispersed magnetic layer coating liquid; 1.5 parts of polyisocyanate were then added. To each of the dispersed liquids for the nonmagnetic layer and magnetic layer were then added 40 parts of a mixed solvent of methyl ethyl ketone and cyclohexanone and the mixtures were passed through filters having an average pore diameter of 1 μm to prepare coating liquids for the nonmagnetic layer and magnetic layer.

The nonmagnetic layer coating liquid obtained was coated and dried to yield a dry thickness of 1.5 μm on a polyethylene terephthalate support having a thickness of 7 μm and a centerline average surface roughness (cutoff value of 0.25 mm) of 0.01 μm, after which a magnetic layer was coated thereover in such quantity as to yield a thickness of 0.07 μm. While the magnetic layer was still wet, it was oriented with a cobalt magnet having a magnetic force of 0.3 T (3,000 G), smoothed (by application of shear) with a solid smoother having a surface roughness Ra of 1.2 nm, oriented with a solenoid having a magnetic force of 0.15 T (1,500 G), dried, processed at 90° C. with a seven-stage calender comprising only metal rolls, and slit to ½ inch to obtain a magnetic tape.
Embodiments 2 to 5

With the exception that the magnetic material and magnetic layer thickness were changed to the values shown in Table 1, preparation was conducted in the same manner as in Embodiment 1.

COMPARATIVE EXAMPLE 1

The same binder was employed as in Embodiments (equivalent to Embodiment 14 in Japanese Unexamined Patent Publication (KOKAI) Heisei No. 9-27115), but a wet-on-wet coating method was employed and no smoothing treatment was conducted. Because the magnetic layer was thick, residual magnetization Φr exceeded 50 mA.

COMPARATIVE EXAMPLE 2

Comparative Example 2 corresponds to Embodiment 4 in Japanese Unexamined Patent Publication (KOKAI) No. 2001-256633. A wet-on-wet coating method was employed and no smoothing was conducted.

COMPARATIVE EXAMPLE 3

In Comparative Example 3, polyurethane B was employed as binder in this example. A wet-on-wet coating method was employed and no smoothing was conducted.
Evaluation Methods (1) Residual Magnetization A vibrating sample magnetometer (made by Toei Kogyo) was employed to take measurements at Hm 796 kA/m (10 kOe).

(2) Output, S/N Ratio

Measurements were taken with a drum tester. The relative velocity was set to 10.5 m/sec. An MIG head with a Bs of 1.2 T and a gap length of 0.22 μm was employed as recording head to record a signal at a single frequency (21 MHz) at a recording wavelength of 0.5 μm at the optimum recording current. An MR head with an element thickness of 0.2 μm and a Bs of 0.8 T was employed for reproduction. The 21 MHz reproduction output and the full-band integrated noise of the modulation noise spectrum were obtained in a noise spectrum measured with a spectral analyzer manufactured by Shibasoku as the S/N ratio. Comparative Example 1 was adopted as the output and S/N ratio standards.

(3) Magnetic Clusters

A magnetic force image was obtained by measuring a 5×5 μm area at a lift height of 40 nm with a Nanoscope III made by Digital Instruments Co. in MFM mode for a sample erased in a 60 Hz alternating-current magnetic field and a sample that was direct-current magnetized with an external magnetic field of 796 kA/m (10 kOe) with a VSM. The threshold was set to 70 percent of the standard deviation (rms) value of the magnetic force distribution, the images were rendered binary, and only portions having a magnetic force of 70 percent or greater were displayed. This image was inputted to an image analyzer (KS400), the noise was removed, hole-filling was conducted, and the average surface area was calculated.

(4) The Volume Packing Density of the Magnetic Material

The total volume of nonvolatile components was calculated from the specific gravity and weight of all magnetic layer components but the solvent. The $N_2$ adsorption method was used to calculate the void ratio of the magnetic layer, this was added to the total volume of nonvolatile components, and the magnetic material packing density was calculated from the following equation.

Magnetic material packing density=magnetic powder volume/(total volume of nonvolatile components×100/(100-void ratio))

the MR head occurred and poorer reproduction output and a poorer S/N ratio were exhibited than in the Embodiments.

Comparative Examples 2 and 3 had Φr values falling within a range of 5 to 50 mA, in which MR head saturation did not occur. However, they also had Sdc/Sac ratios exceeding 2.0, in which broad band noise was high, so their S/N ratios decreased.

The present invention provides a magnetic recording medium exhibiting reduced noises and good S/N ratio.

The present disclosure relates to the subject matter contained in Japanese Patent Application No. 2002-267480 filed on Sep. 13, 2002, which is expressly incorporated herein by reference in its entirety.

What is claimed is:

1. A magnetic recording medium comprising a magnetic layer comprising a ferromagnetic powder and a binder on a nonmagnetic support, wherein
    the magnetic layer has a residual magnetization Φr ranging from 5 to 50 mA, and
    ratio (Sdc/Sac) of average area Sdc of magnetic clusters under DC magnetized condition to average area Sac of magnetic clusters under AC erased condition ranges from 0.8 to 2.0.

2. The magnetic recording medium according to claim 1, wherein the ferromagnetic powder has an average particle size which denotes a maximum length in a powder having an anisotropic shape and ranges from 5 to 120 nm.

3. The magnetic recording medium according to claim 1, wherein the ferromagnetic powder in the magnetic layer has a volume packing density equal to or higher than 35 percent.

4. The magnetic recording medium according to claim 1, wherein the magnetic layer has a residual magnetization Φr ranging from 7 to 40 mA.

TABLE 1

|  |  | Embodiment 1 | Embodiment 2 | Embodiment 3 | Embodiment 4 | Embodiment 5 | Comp. Ex. 1 | Comp. Ex. 2 | Comp. Ex. 3 |
|---|---|---|---|---|---|---|---|---|---|
| Magnetic material | Type | Metal | Metal | Metal | Metal | BaFe | Metal | Metal | Metal |
|  | Average particle diameter (nm) | 45 | 45 | 60 | 45 | 25 | 85 | 100 | 45 |
|  | σs (A·m²/kg) | 110 | 110 | 125 | 110 | 50 | 138 | 110 | 110 |
| Magnetic layer thickness (nm) |  | 60 | 30 | 120 | 60 | 100 | 150 | 50 | 60 |
| Residual magnetization Φr(mA) |  | 14.5 | 7 | 45 | 12.5 | 10 | 51 | 17 | 11.5 |
| Sdc(nm²) |  | 25000 | 19000 | 50000 | 21000 | 14000 | 56000 | 85000 | 375000 |
| Sac(nm²) |  | 185000 | 17000 | 28000 | 18000 | 15000 | 26000 | 31000 | 18000 |
| Sdc/Sac |  | 1.35 | 1.12 | 1.79 | 1.17 | 0.93 | 2.15 | 2.74 | 2.08 |
| Quantity of binder (weight part) | Polyurethane A | 12 | 12 | 8 | 18 | 12 | 12 |  |  |
|  | Polyurethane B |  |  |  |  |  |  | 5 | 22 |
|  | Vinyl chloride copolymer |  |  |  |  |  |  | 3 |  |
| Smoothing treatment |  | Done | Done | Done | Done | Done | None | None | None |
| Volume packing density of magnetic material (%) |  | 40 | 40 | 46 | 36 | 45 | 39 | 46 | 31 |
| Evaluation results | Reproduction output (dB) | −1.7 | −3.5 | 0 | −2 | −2.2 | 0 | −1.5 | −2 |
|  | SN ratio (dB) | 6.5 | 4.1 | 4.5 | 5.8 | 6.7 | 0 | −0.8 | 0.8 |

DESCRIPTION OF EMBODIMENTS AND COMPARATIVE EXAMPLES

Embodiments 1 to 5 all exhibited Φr values falling within a range of 5 to 50 mA and Sdc/Sac ratios falling within a range of 0.8 to 2.0, and thus had good reproduction output and S/N ratios.

Comparative Example 1 had a Sdc/Sac ratio exceeding 2.0 and a Φr value exceeding 50 mA, in which saturation of 5. The magnetic recording medium according to claim 1, wherein the magnetic layer has a residual magnetization Φr ranging from 10 to 35 mA.

6. The magnetic recording medium according to claim 1, wherein the ferromagnetic powder has a σs ranging from 50 to 130 A·m²/kg.

7. The magnetic recording medium according to claim 1, wherein the ratio (Sdc/Sac) ranges from 0.8 to 1.7.

8. The magnetic recording medium according to claim 1, wherein the ratio (Sdc/Sac) ranges from 0.8 to 1.5.

9. The magnetic recording medium according to claim 1, wherein the average area Sdc of magnetic clusters under DC magnetized condition and the average area Sac of magnetic clusters under AC erased condition respectively ranges from 3,000 to 50,000 $nm^2$.

10. The magnetic recording medium according to claim 1, wherein the average area Sdc of magnetic clusters under DC magnetized condition and the average area Sac of magnetic clusters under AC erased condition respectively ranges from 4,000 to 40,000 $nm^2$.

11. The magnetic recording medium according to claim 1, wherein the average area Sdc of magnetic clusters under DC magnetized condition and the average area Sac of magnetic clusters under AC erased condition respectively ranges from 5,000 to 35,000 $nm^2$.

12. The magnetic recording medium according to claim 1, wherein the magnetic layer has a thickness ranging from 10 to 150 nm.

13. The magnetic recording medium according to claim 1, wherein the magnetic layer has a thickness ranging from 20 to 120 nm.

14. The magnetic recording medium according to claim 1, wherein the magnetic layer has a thickness ranging from 30 to 100 nm.

* * * * *